United States Patent [19]

Infanti

[11] Patent Number: 4,971,737
[45] Date of Patent: Nov. 20, 1990

[54] METHOD FOR FORMING ICE SCULPTURES

[75] Inventor: Vittorio Infanti, Staten Island, N.Y.

[73] Assignee: Infanti Chair Manufacturing, Corp., Staten Island, N.Y.

[21] Appl. No.: 332,660

[22] Filed: Apr. 3, 1989

Related U.S. Application Data

[60] Division of Ser. No. 194,442, May 16, 1988, Pat. No. 4,817,911, which is a continuation-in-part of Ser. No. 799,092, Nov. 18, 1985, abandoned.

[51] Int. Cl.$^5$ ............................ F25C 1/22; B29C 39/40
[52] U.S. Cl. ............................................ 264/28; 62/66;
        62/340; 249/55; 264/313; 264/DIG. 30;
        425/442; 425/DIG. 44
[58] Field of Search ................ 264/28, 313, 348, 334,
        264/DIG. 30; 249/55, 82, 167, 112, 114.1, 135,
        169, 170, 127; 62/66, 340, 356, 60; 425/DIG.
        44; 426/515

[56] References Cited

U.S. PATENT DOCUMENTS

| | | | |
|---|---|---|---|
| 2,939,299 | 6/1960 | Sherbloom | 249/55 |
| 4,206,899 | 6/1980 | Whitehead | 249/55 |
| 4,669,271 | 6/1987 | Noel | 249/55 |

*Primary Examiner*—Jeffery Thurlow
*Assistant Examiner*—Mathieu Vargot
*Attorney, Agent, or Firm*—Louis Weinstein

[57] ABSTRACT

Method for producing an ice scupture employing the steps of forming rigid metallic mold halves from the objects, said mold halves having recesses which collectively define the object; yieldably joining said rigid mold halves together at discrete locations; filling said mold halves with a freezable liquid; chilling the assembly sufficient to freeze the freezable liquid; allowing the mold halves to become differentially displaced from one another as the freezable liquid expands; disassembling said mold halves from one another to remove the ice sculpture therefrom peeling away said rubber mold from sculpture. In another embodiment, the rubber mold is eliminated and replaced by a sealing gasket. Additives may be employed to add color and/or obtain clarity.

6 Claims, 10 Drawing Sheets

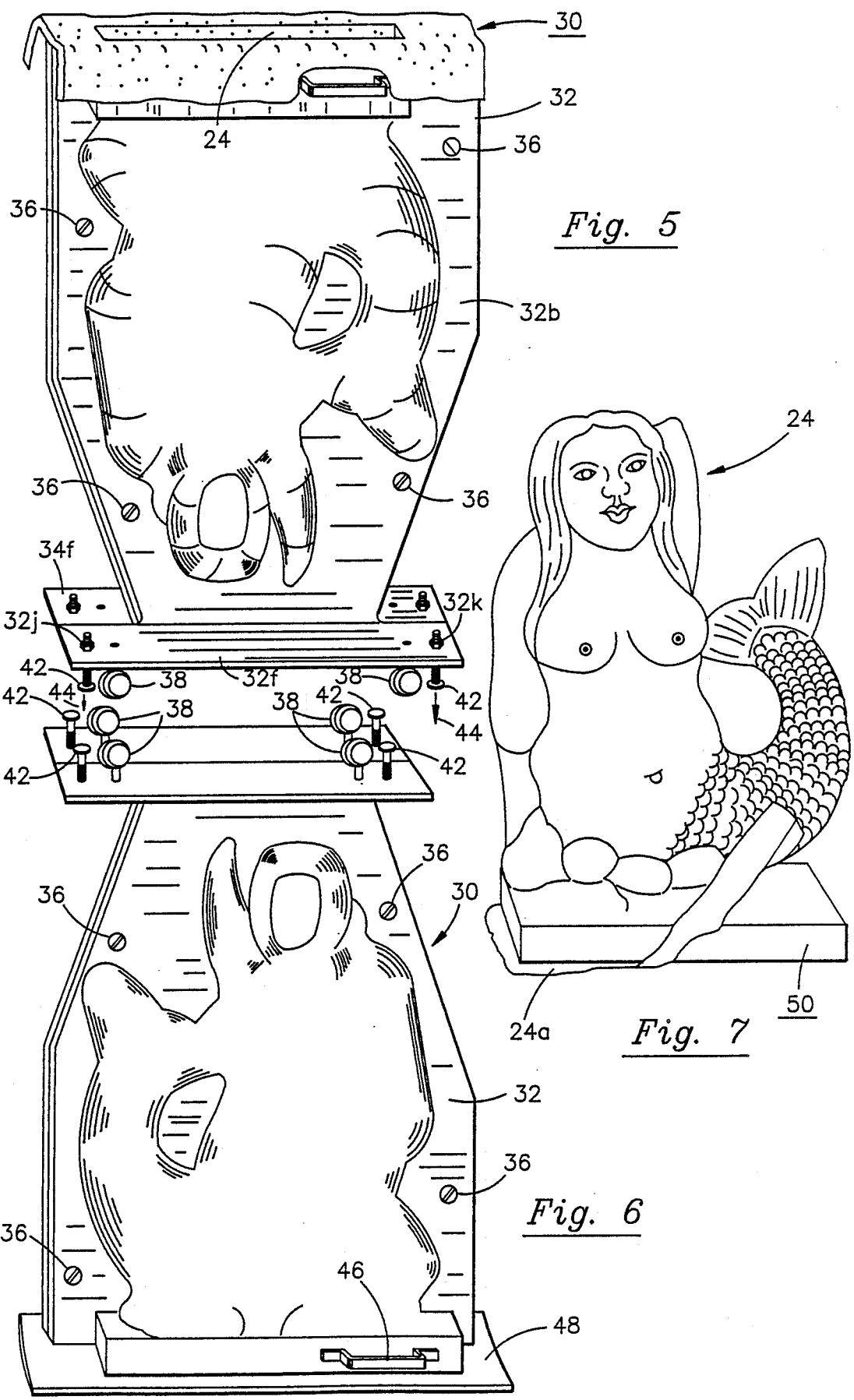

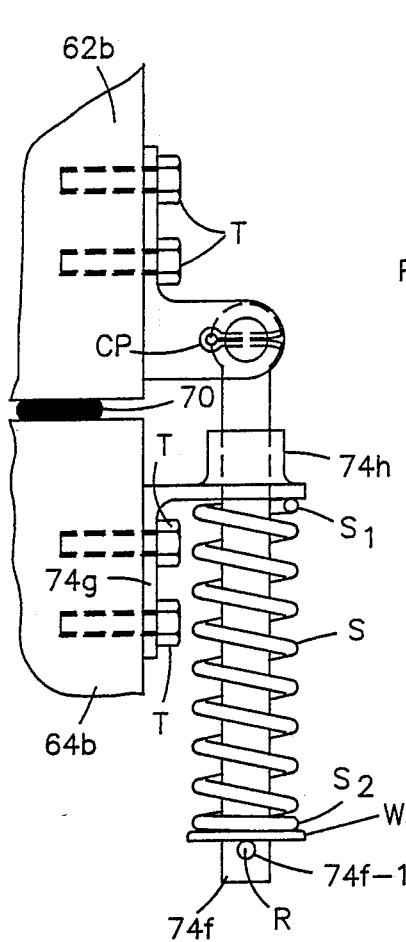
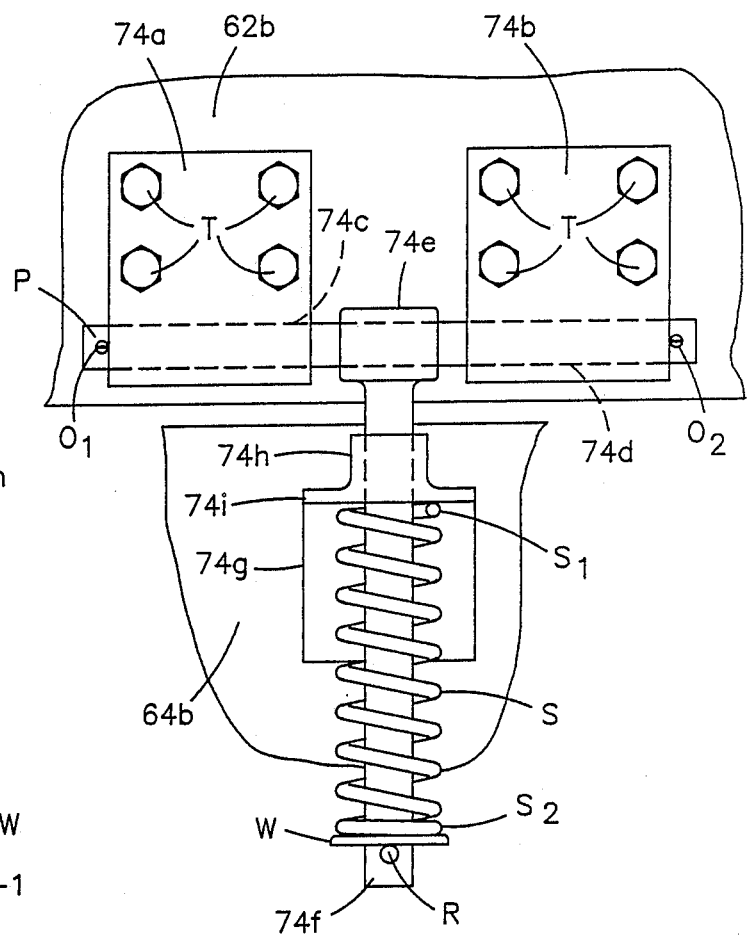
Fig. 9a
Fig. 9b

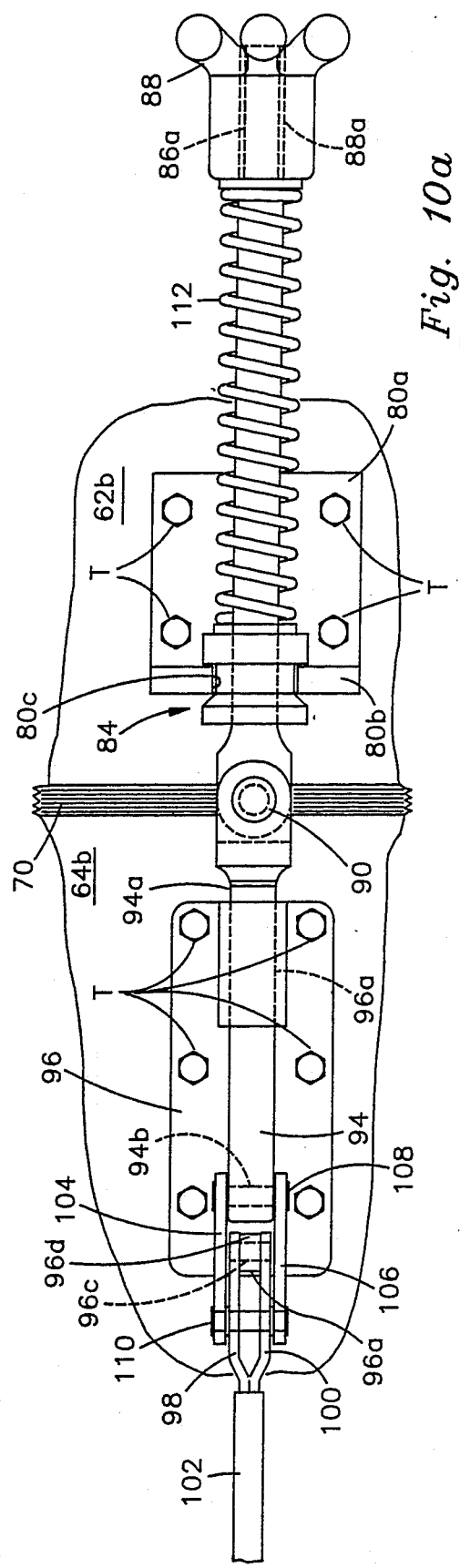
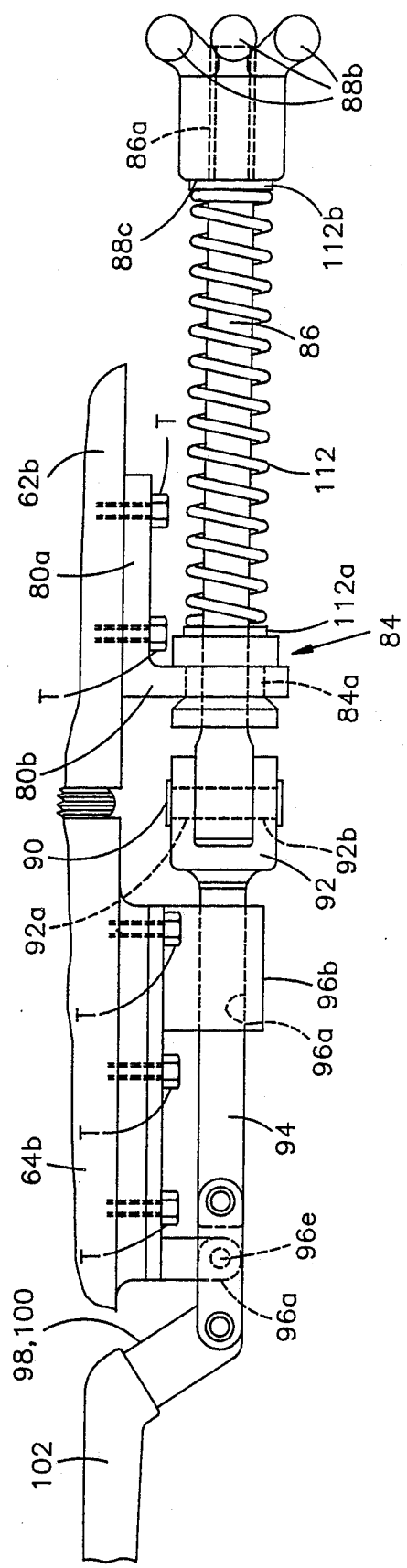
Fig. 10a
Fig. 10b

METHOD FOR FORMING ICE SCULPTURES

This is a division, of application Ser. No. 194,442, filed May 16, 1988, now U.S. Pat. No. 4,817,911, which is a continuation-in-part of application Ser. No. 799,092 filed Nov. 18, 1985 now abandoned.

FIELD OF THE INVENTION

The present invention relates to ice sculptures and more particularly to novel method and apparatus for producing ice sculptures of high quality and fine detail in a simple and inexpensive manner.

BACKGROUND OF THE INVENTION

Ice sculptures are typically utilized by restaurants, catering groups and even individuals for complementing and beautifying table arrangements at luncheons, buffets, banquets and all sorts of catered affairs. Ice sculptures, and especially ice sculptures of large size, are typically sculptured from a large block of ice just prior to their time of use requiring a high degree of painstaking skill, making such ice sculptures rather costly.

Techniques have been developed for making small size ice sculptures from mold sections which are joined together by fastening members. However, they are impractical for use in producing large ice sculptures.

Other techniques utilizing a rubber-like mold having a sectionalized portion have been utilized to produce members made of plaster. This technique which also forms unsightly seams, further requires the provision of a supporting casting of plaster of paris molded about the exterior of the mold and which must be cut into sections to facilitate removal of the finished article.

BRIEF DESCRIPTION OF THE INVENTION

The present invention is characterized by comprising a method and apparatus for forming ice sculptures, and especially ice sculptures of large size. One embodiment thereof utilizes a rubber-like resilient stretchable mold of the piece which is to be the object of the ice sculpture is formed by a spraying operation to produce a rubber-like mold made up of a plurality of the aforesaid layers formed over the object to be produced. Rigid metallic mold halves are formed preferably through a casting operation such as a sand casting operation to form two rigid metallic mold halves, each having depressions conforming to the front and back, for example, of the object. The top end of the rigid mold halves, when joined together, is open. The rubber-like mold is positioned between the two mold halves which are designed so that when they are joined together, the open end of the rubber-like mold is aligned with the open end of said joined mold halves. The lower end of the mold halves includes a base assembly having casters for rollingly supporting the assembly to facilitate movement thereof. The rigid mold halves are formed of a metallic material having good conductivity to provide more uniform cooling of the forming ice sculpture.

The rubber-like mold is filled with a freezable liquid and is thereafter chilled to freeze the freezable liquid. A clear ice sculpture is obtained through the use of filtered water.

The ice sculpture is removed by turning the molding assembly upside down; disassembling the rigid mold halves and peeling the rubber-like mold away from the mold halves leaving the completed ice sculpture arranged in the proper, upright position.

The rubber-like mold is preferably formed of a very soft rubber material and the number of layers sprayed should be at least two and preferably five or six.

The metallic mold halves not only provide uniform cooling, but significantly reduce the time for cooling. The rubber-like mold has been found to be reusable to make one hundred to two hundred ice sculptures.

In still another and preferred embodiment of the present invention, the rubber-like mold may be totally eliminated and at least one of the rigid mold halves is provided with a resilient compressible gasket to establish a liquid-tight seal arranged about the rim of the mold cavity. In the production of decorative ice forms or ice sculptures of large size the water expands quite considerably as it freezes. This expansion is significantly greater as the size of the decorative form is increased. The weight of the large decorative forms of interest is typically greater than 100 pounds and preferably in the range of 150 to 350 pounds. A 40 inch high ice form, for example, can break any rigid mold regardless of the material used to form the mold and in addition, the weight of the water placed in the mold is also a factor.

A mold capable of producing such large, decorative ice forms comprises a split mold of two mold halves each preferably cast of tempered aluminum. The mold halves are swingably joined together along one side thereof by means of spring-loaded hinges capable of yielding to the expanding forces of the forming ice while at the same time being adjusted to apply sufficient pressure to keep the mold closed and sealed to prevent leakage of the large body of water placed in the mold preparatory to the freezing process.

The mold halves are further provided with spring-loaded locks incorporating a toggle action closing pull which works against an adjustable high pressure spring with a large spring constant enabling both sides of the mold to expand equally and in a controlled manner due to the forces of the freezing water as it expands.

Although it is not necessary to do so, the mold may be provided with a latex liner having a design which comforms with the design of the cavity. The liner may simply be a thin gauge plastic liner or a liner of the type described above.

The mold is preferably filled with fresh water through the top open end. The ice is preferably formed slowly, typically over a span of 20 to 40 hours while maintaining a freezer temperature in the range from 28° to 30° F. The mold assembly is then removed from the freezer and left to stand at room temperature for approximately 30 minutes whereupon it is unlocked and the ice casting is released. In the event that a light latex is used, it can be peeled up and off. An insulating bag may be used to cover the open end to cause the water to freeze more uniformly over the height of the mold assembly.

OBJECT OF THE INVENTION AND BRIEF DESCRIPTION OF THE FIGURES

It is, therefore, one object of the present invention to provide a novel method and apparatus for producing high-quality, large size ice sculptures having extremely fine detail in a simple manner.

Still another object of the present invention is to provide a novel method and apparatus for producing ice sculptures and the like comprising the use of a thin rubber-like mold positioned between rigid metallic mold halves releasably secured during the chilling operation.

Still another object of the present invention is to provide a method and apparatus of the character described wherein both said rubber mold and said metallic mold halves are formed from the object which is the subject of the ice sculpture.

Another object of the present invention is to provide a novel method and apparatus for producing large, heavy ice sculptures and the like through the use of mold halves hingedly connected along one side thereof by means of spring-loaded hinges and being closed along an opposite side thereof by means of spring-loaded locks incorporating a toggle action closing pull which operates against an adjustable high pressure spring to provide uniform controlled expansion of the mold halves as the water freezes.

Still another object of the present invention is to provide a split mold assembly for use in forming large ice sculptures and the like including a resilient compressible gasket arranged along one of the mold halves and surrounding the mold cavity to provide a watertight seal to prevent leakage during the freezing process.

Still another object of the present invention is to provide a novel split mold assembly for use in forming large ice sculptures and the like and further incorporating an insulating bag which is placed over the top open end of the mold half preparatory to placement in a freezer to assure more uniform freezing of the water.

The above, as well as other objects of the present invention will become apparent when reading the accompanying description and drawing in which:

FIG. 5 is a perspective view showing the two rigid mold halves of FIG. 3 and the rubber-like mold of FIG. 2 fully assembled in readiness form forming an ice sculpture.

FIG. 6 is a perspective view showing the portion of the assembly shown in FIG. 5 in readiness for removal of the sculptured ice piece.

FIG. 7 shows the completed sculptured ice piece arranged within the rubber-like mold and the manner in which the rubber-like mold is removed.

FIG. 8a shows a sectional view of the mold assembly of FIG. 8 looking in a direction of arrows 8a—8a.

FIGS. 9a and 9b are plan and side views respectively of the high compression spring expansion hinges employed in the mold assembly of FIG. 8.

FIGS. 10a and 10b are plan and elevational views respectively of the high compression spring expansion lock assembly employed in the mold assembly of FIG. 8.

DETAILED DESCRIPTION OF THE INVENTION

Figure 1:
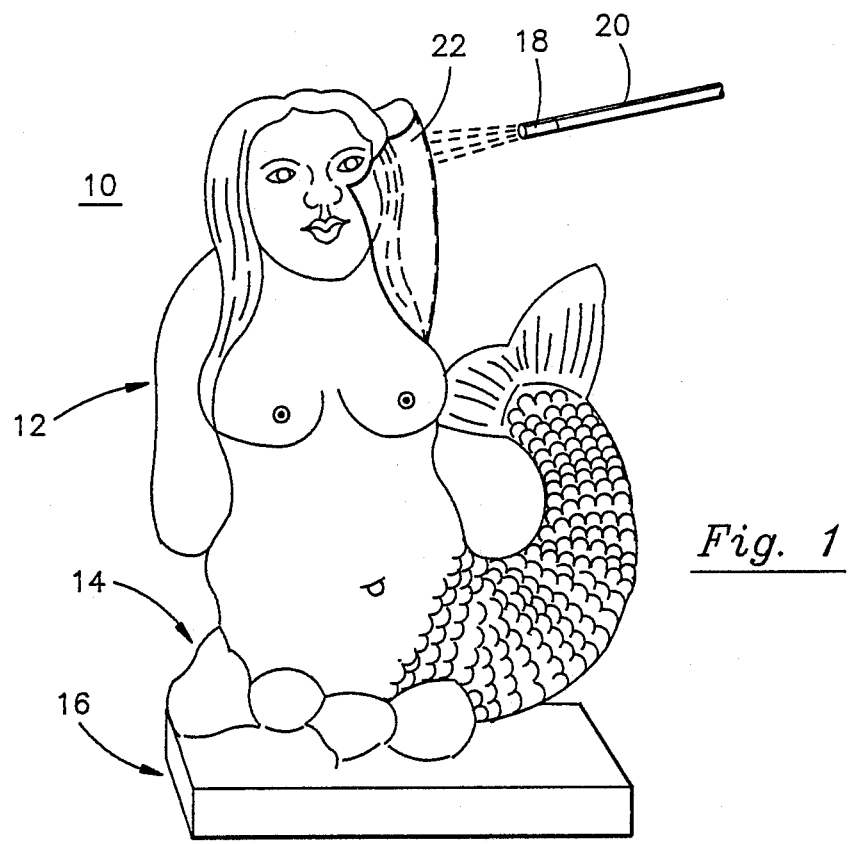
FIG. 1 is a perspective view showing a piece from which an ice sculpture may be formed and showing the manner in which the resilient rubber-like mold of the piece is formed.

The piece from which the sculptured ice piece is derived is initially prepared and may be any person or scene or object depending upon the particular objective or scene of the gathering in which the sculptured ice piece is to be used. For example, FIG. 1 shows a piece 10 which depicts a mermaid 12 resting upon some rocks 14, all of which are supported upon a substantially rectangular-shaped pedestal 16. The piece 10 may, for example, be formed of wood, plastic, plaster of paris, or any metal or any other suitable material. It is preferred that said material be a material other than ice, since the time and temperature conditions appropriate for forming the rubber-like mold are not conducive to retaining a sculptured ice piece in a frozen condition.

Figure 2:
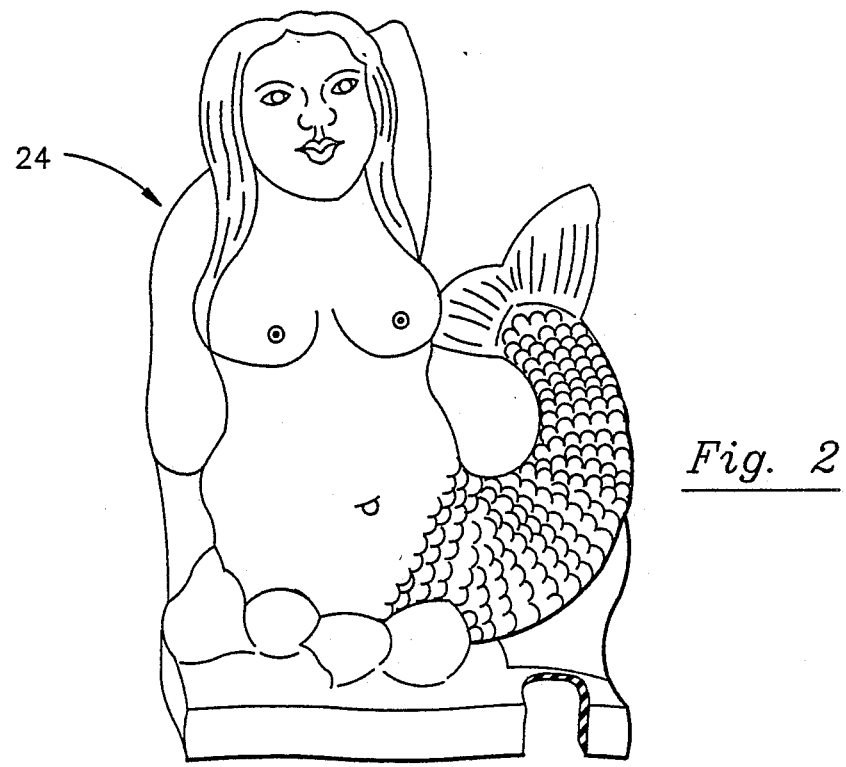
FIG. 2 is a perspective view showing the finished rubber mold with a portion of said mold removed to facilitate an explanation thereof.

A mixture of a soft rubber material, such as paratol latex adhesive in liquid form is sprayed from the nozzle 18 of a spraying device comprised of a conduit 20 coupled to a source of said liquid material and including a suitable pumping means (not shown) for pumping said liquid material from the source through said conduit 20 and out through the open end of nozzle 18 in order to be sprayed upon the piece 10. FIG. 1 shows object 10 with the rubber-like material 22 formed upon a portion of the piece 10 as the process is progressing. The liquid material is ultimately sprayed over the entire piece, including the mermaid 12, rocks 14, and the vertical sidewalls of pedestal 16. After the piece has been sprayed completely, the material is allowed to dry for a period of approximately 60 minute and is thereafter sprayed a second time. The second layer is also allowed to dry for a similar time period and, a third, forth and subsequent layers may be formed. Typically, five to six layers have been found sufficient to form a sturdy, serviceable mold which may be used to form a few hundred ice sculptures, so long as the rubber-like mold member is not abused in performing the method of the present invention. FIG. 2 shows a rubber-like mold 24 formed in accordance with the process described hereinabove in connection with FIG. 1. The thickness of a typical mold is of the order of ⅛ inches.

Figure 3:
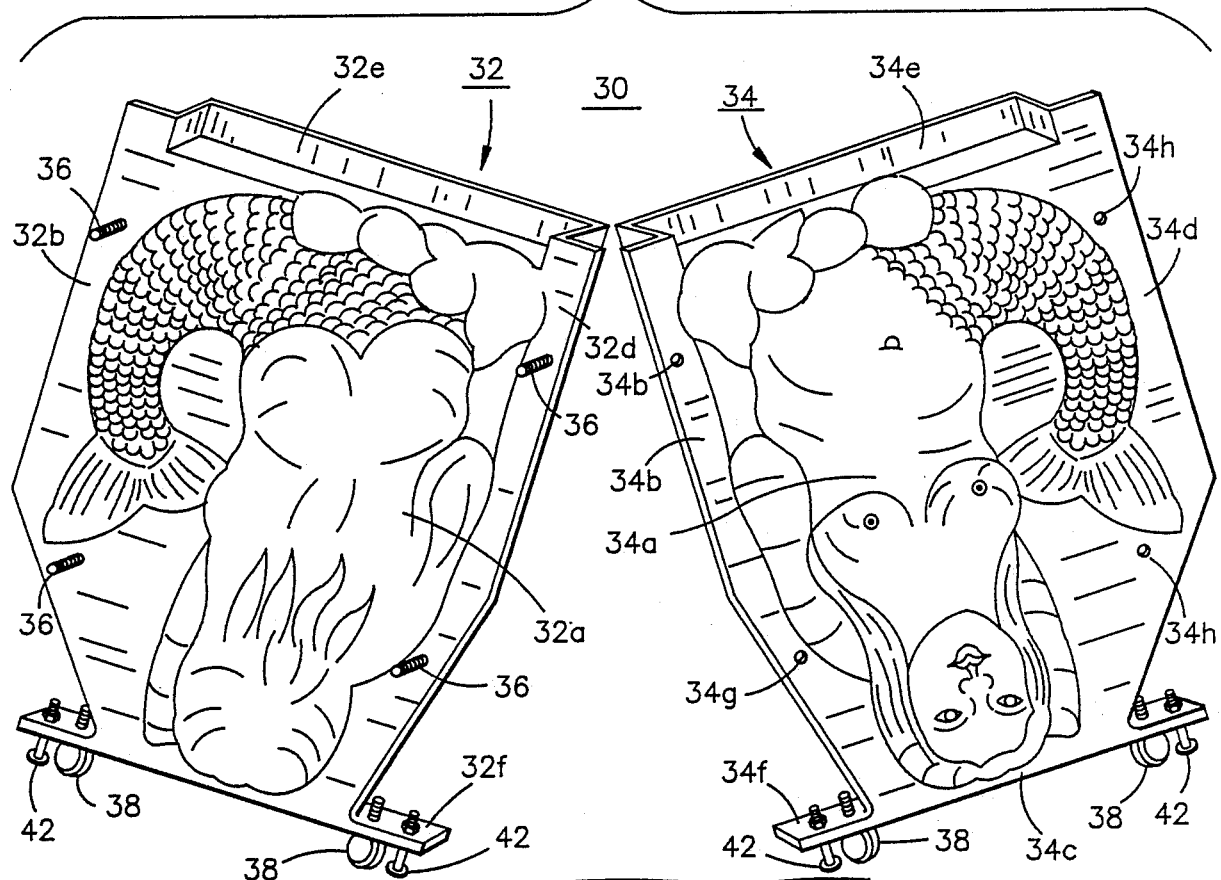
FIG. 3 is an exploded perspective view showing first and second substantially rigid wheelable mold halves utilized in the sculpture forming process.
Figure 4:
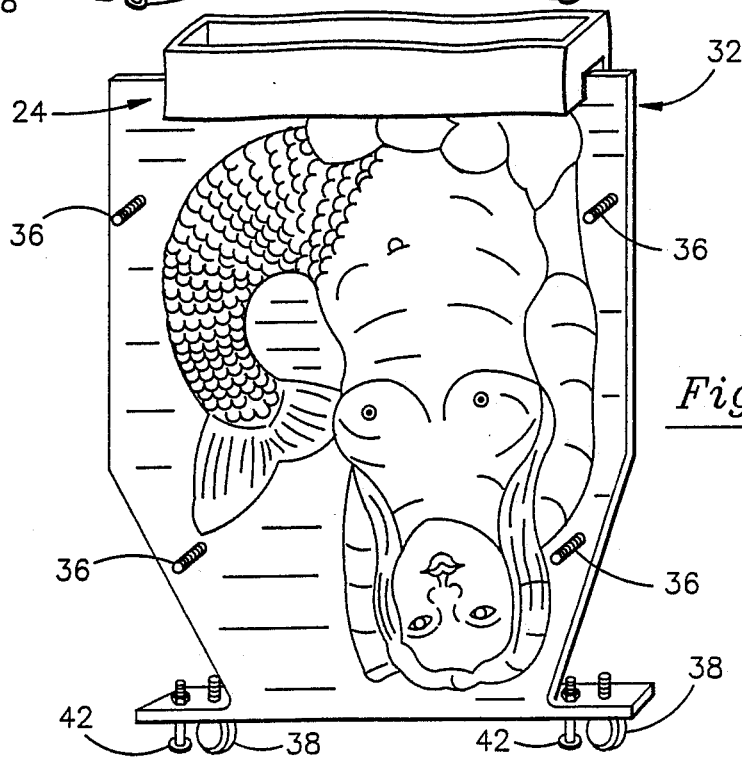
FIG. 4 is a perspective view showing the manner in which the rubber-like mold of FIG. 2 is placed against one of the rigid mold halves of FIG. 3.

The piece 10 (which could be any large decorative form) is utilized to form a rigid mold assembly 30 comprised of the mold halves 32 and 34, shown in FIG. 3. Each of the mold halves 32 and 34 shown in FIG. 3 are preferably cast from aluminum, although any other type of metal having good conductivity may be employed. The mold halves are preferably formed using conventional sand molding techniques and are produced from the original piece 10 shown in FIG. 1. The resulting cast mold halves 32 and 34 are each comprised of a recess or depression 32a, 34a, representing the back and front respectively of the object 10, said depressions 32a and 34a being surrounded by substantially planar marginal portions 32b through 32d and 34b through 34d surrounding cavities 32a, 34a on three sides. The remaining sides are provided with elongated rectangular shaped recesses 32e, 34 which cooperatively define the pedestal portion 16 of object 10 as shown in FIG. 1.

The lower marginal portions 32c, 34c are bent to form base portions 32f, 34f, each of which is provided with a pair of caster assemblies 38 which rollingly support the rigid metallic mold halves 32 and 34.

Marginal portions 32b and 32d are provided with elongated projecting pins 36 which extend through cooperating openings 34g in marginal portion 34b and in 34h in marginal portion 34d. The metallic mold halves are joined together in a manner to be more fully described in connection with FIGS. 5 and 5a. Preparatory to the joining of the metallic mold halves 32 and 34, the resilient rubber-like mold 24 is placed within mold half 32, for example, shown best in FIG. 1, so that the back of the rubber-like mold rests within recess 32a of metallic mold half 32. Thereafter, metallic mold half 34 is aligned with mold half 32 and the mold halves are brought together. The preferred manner for securing the metallic mold halves 32 and 34 will be described hereinbelow.

With the metallic mold halves 32 and 34 securely fastened to one another, the open end of rubber-like mold 24 is filled with water, preferably filtered, and is placed in a suitable freezer. Base portions 32f, 34f of metallic mold halves 32, 34 are each provided with a pair of elongated threaded fasteners 42 which threadedly engage tapped openings 32j and 32k in base portion 32f. The threaded members 42 are selectively rotated to extend further downwardly in the direction shown by arrows 44 so that their lower ends extend below the casters 38 to prevent the mold assembly 30 from rolling upon the supporting surface.

The assembly 30 is kept in the freezer until the water in rubber-like mold 24 freezes, at which time the assembly 34 may be removed from the freezer. The time required for freezing the ice sculpture is reduced due to the employment of a relatively thin rubber-like mold 24 and the employment of the first and second metallic mold halves 32 and 34 which uniformly cool the water in mold 24 due to the conductivity of the mold halves 32 and 34.

The rigid mold halves 32 and 34 serve to cause the rubber-like mold 24 to retain its integrity and the rubber-like mold experiencing no noticeable distortion in spite of the weight of the water, to assure formation of an ice sculpture which is identical in every feature to the original object 10. The use of a continuous seamless rubber-like mold 24 prevents the formations of any seams on the finished ice sculpture. The use of filtered water assures the formation of an ice sculpture with good, uniform clarity.

When the water is frozen throughout, the assembly 30 is removed from the freezer and turned upside-down in the manner shown in FIG. 6. The assembly 30 is preferably placed upon a table or board upon which the finished ice sculpture is to be displayed, such as, for example, the support surface 48. Each of the rigid mold halves 32, 34 is provided with a handle, such as, for example, a handle 46 provided on mold half 32, to facilitate handling and transportation of the assembly 30. The mold halves 32 and 34 are separated from one another, leaving the sculptured ice piece 40 within the rubber-like mold 24. The lower marginal portion 24a of rubber-like mold 24 is peeled away from the ice sculpture simply by lifting the rubber-like mold lightly away from the ice sculpture and pulling the rubber-like mold upwardly. The nature of the rubber material is such as to be easily peeled away from the ice sculpture. The rubber material is sufficiently resilient and stretchable to withstand being pulled away from ice sculpture 50 without undergoing any permanent distortion, tearing, or other damage. The details of the finished ice sculpture are identical in every respect to the original piece, the finished ice sculpture 50 is perfectly clear, contains no bubbles and no noticeable seams or other imperfections.

The metallic mold halves 32 and 34 may be used indefinitely to produce an extremely large number of ice sculptures. The rubber-like mold 24 has been found to be capable of producing at least a few hundred ice sculptures before suffering any noticeable deterioration. The rigid mold halves 32, 34 support the rubber-like mold over its entire surface area to assure that the finished product will contain no noticeable distorted features or characteristics.

The mold halves may be held together by using toggle clamps. The toggle clamps may be placed in any advantageous position around the periphery of the mold halves, and may be varied in placement and number to suit the particular mold. Furthermore, the toggle clamps may be provided with spring reliefs, allowing expansion of the mold halves caused by freezing of the ice in the mold without placing undue stress upon the mold halves or causing the mold halves to break apart entirely.

In still another preferred embodiment of the present invention which fully takes into account the significant expansion of the water during the freezing process of large decorative ice forms, is provided a mold assembly 60 comprised of mold halves 62, 64 which are preferably formed of a metallic material such as aluminum and in which the decorative ice form is produced, for example, by a stamping or by a sand casting operation. The mold assembly of FIG. 5 is not capable of molding large ice forms without breaking due to the significant expansion experienced by the water when making molds of a height of several feet and weighing from 100 to 300 pounds when frozen.

Each of the mold halves is preferably provided with four sides arranged at right angles to the land portions of each mold half to greatly enhance the structural strength of each mold half. Note, for example, mold half 64 having vertical sides 64a and 64b and top and bottom sides 64c, 64d. Mold half 62 has a similar arrangement, top side 62c and vertical side 62a being shown in FIG. 8 and vertical sides 62b and 62a and bottom side 62d being shown and the bottom sides 62d and 64d, as shown best in FIG. 8a are provided with plates 66a through 66b and 68a and 68b, respectively for mounting swingable, rollable casters C to facilitate rolling movement of the mold assembly.

Figure 8:
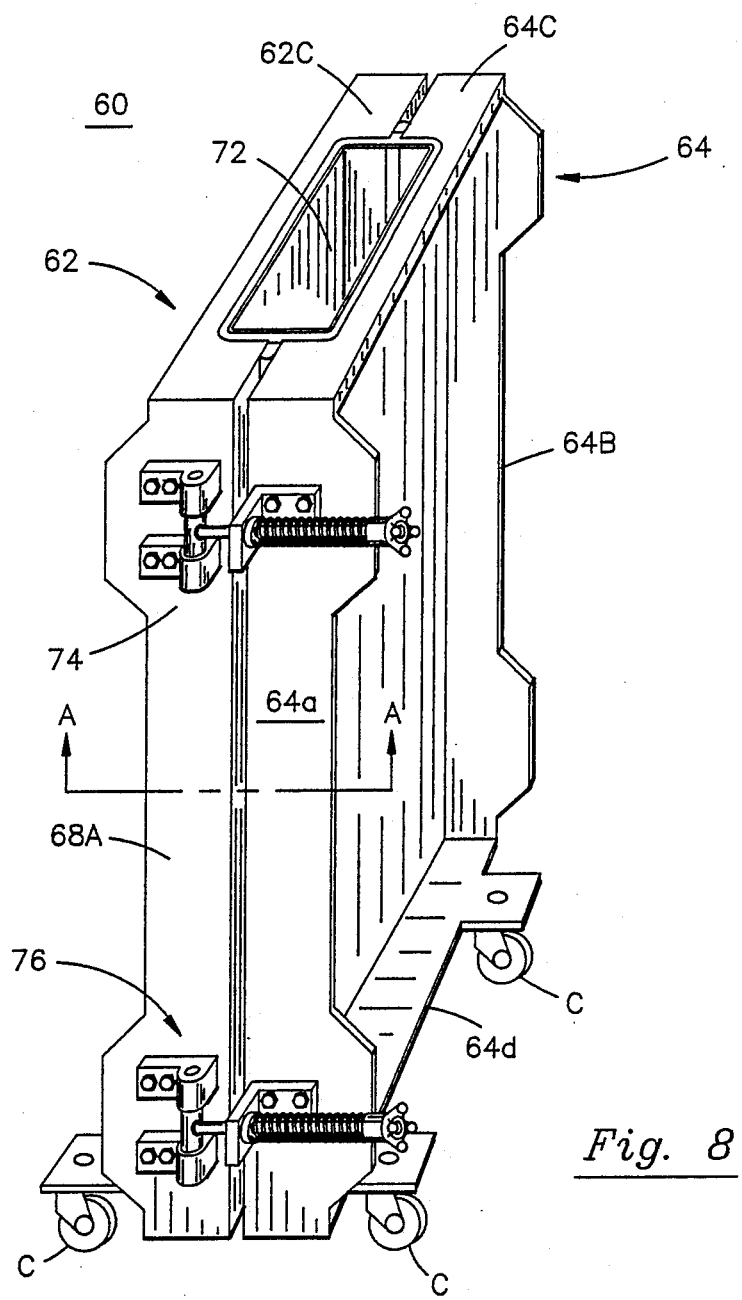
FIG. 8 shows a perspective view of still another preferred embodiment of the present invention.
Figure 8A:
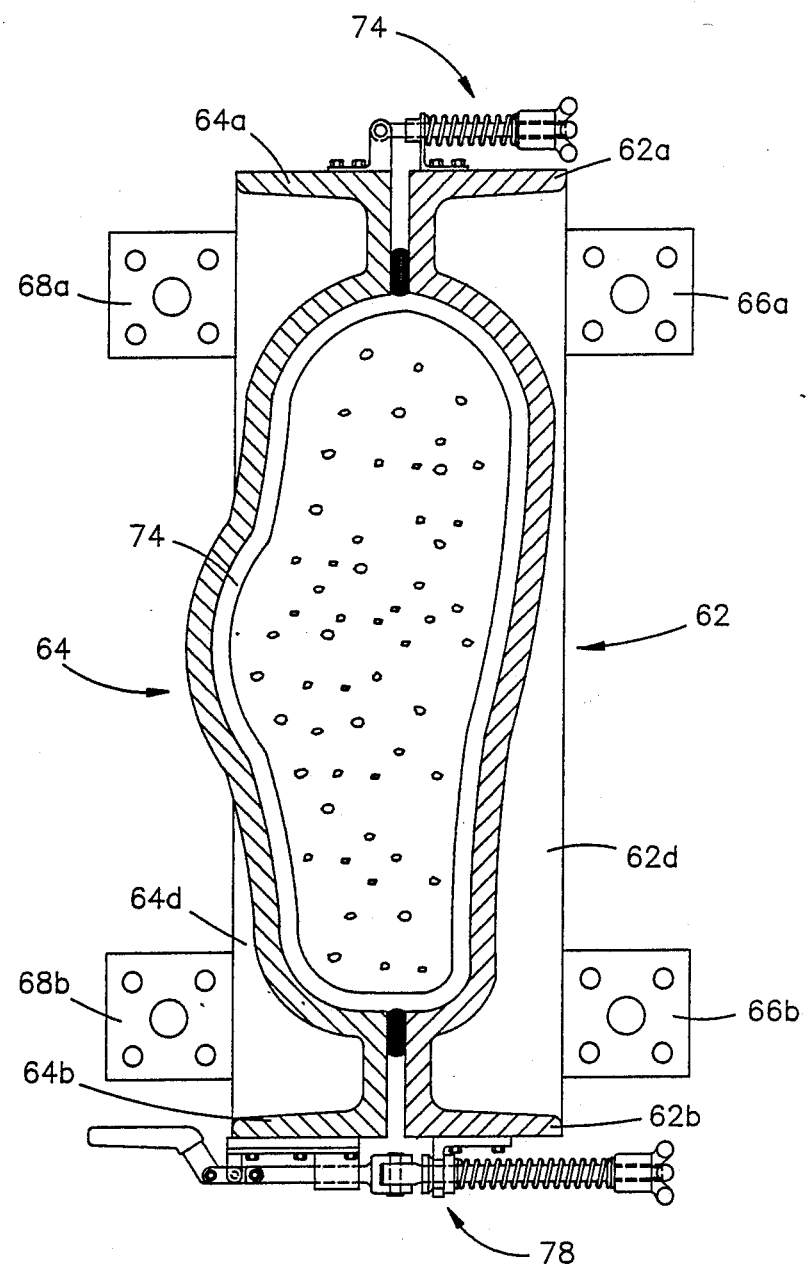
Figure 8B:
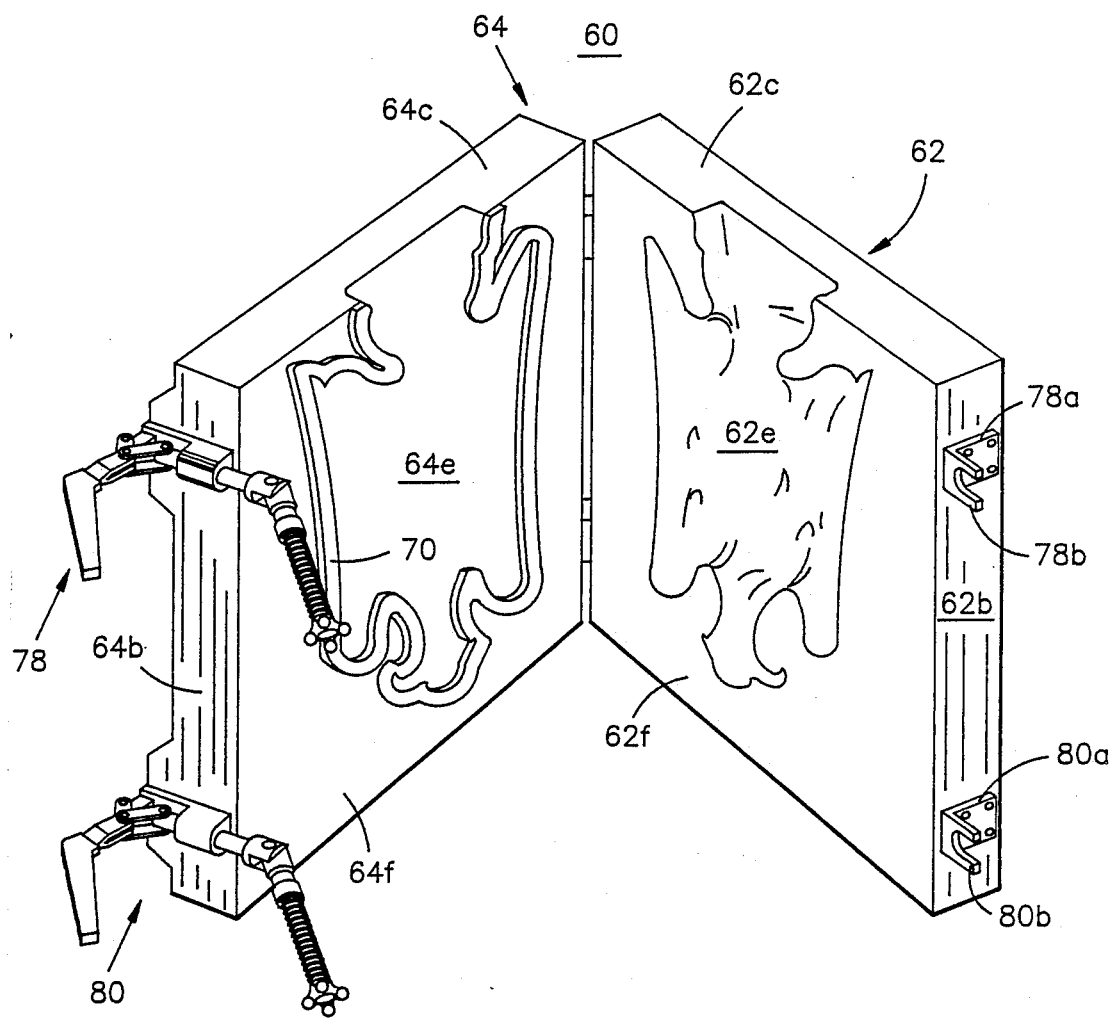
FIG. 8b is a perspective view of the mold assembly of FIG. 8 shown partially open.

FIG. 8b shows the mold assembly 60 in the partially open position with the cavity portions 64e, 62e exposed to view. The land portion 64f surrounding cavity 64e is provided with a resilient compressible seal or gasket 70 which is arranged on the land portion 64f immediately surrounding cavity 64e and substantially conforming to the shape of the cavity perimeter. The resilient compressible gasket 70 engages the land portion 62f of mold half 62 in the region surrounding the perimeter of cavity 62e. The land portion of either mold half may receive gasket 70.

As can clearly be seen from FIGS. 8 through 8b, with the mold in the closed position, cavities 62e, 64e collectively form the mold cavity having an open top end 72.

Mold halves 62 and 64 are hingedly joined by means of compression/expansion spring hinge assemblies 74, 76. Since these hinge assemblies are substantially identical to one another in both design and function, only one such hinge assembly will be described herein for purposes of brevity.

FIG. 8 through 8b and 9a and 9b show an expansion hinge assembly 74 secured to sides 62b and 65b of the mold halves 62 and 64. The hinge assembly is comprised of first and second hinge pin brackets 74a, 74b receiving a plurality of threaded fasteners T for securing the hinge pin brackets to side 62b. A hinge pin P extends through the coaligned bores 74c, 74d provided in the brackets 74a and 74b as shown. The hinge pin P is provided with openings $O_1$ and $O_2$ for receiving cotter pins such as the cotter pin CP shown in FIG. 9a, to retain the hinge pin P in the proper position and to prevent accidental removal of the hinge pin from the hinge pin brackets.

A swing bolt 74e is provided with an opening for receiving hinge pin P and has an elongated cylindrical rod portion 74 integral therewith and extending away from the hinge pin in the manner shown in FIGS. 9a and 9b.

An L-shaped expansion spring load bracket consists of a mounting portion 74g receiving threaded fasteners T for securing the bracket to portion 64b of mold half 64. The remaining portion thereof is provided with a collar 74h having an opening through which cylindrical rod 74f extends. A flat wire compression spring S has one end thereof S1 bearing against the surface 74i and has the other end S2 thereof bearing against a washer W which is maintained in position by a retainer pin R extending through an opening 74f-1 provided in cylindrical rod 74f. Spring S is maintained under a predetermined amount of compression to urge the expansion spring load bracket toward the hinge pin brackets and hence urging the mold halves 62 and 64 toward one another thereby placing rubber seal 70 under compression. Although the high compression spring expansion hinge 74 provides an excellent high compressive force to place rubber seal 70 under compression and thereby provides an excellent watertight seal, the mold is nevertheless easily opened (or closed) by swinging mold halves apart (or together) about the axis of hinge pin P.

In addition thereto, the high compression spring expansion hinge allows the mold halves to be displaced from the one another as shown by the arrow A representing the direction of expansion of the water as it freezes thus enabling the mold to become displaced to fully accommodate the expansion of the freezing water.

As shown best in FIGS. 8a, 8b and 10a through 10c, the mold assembly 60 is provided with a pair of high compression spring expansion locks 78 and 80. Since these expansion locks are substantially identical in both design and function, only one of said lock assemblies will be described herein for purposes of simplicity. As shown in FIGS. 8a, 8b and 10a through 10c, expansion lock assembly 80 is comprised of an L-shaped mounting bracket having a mounting portion 80a secured at 62b to mold half 62. The remaining portion 80b is provided with a U-shaped slot 80c for receiving the reduced diameter portion 84a of a hollow cylindrical shaped member 84 having a hollow center defining an opening 84b for slidably receiving elongated cylindrical rod 86 having a threaded end portion 86a for threadedly coupling the pressure adjusting knob 88 having a tapped opening 88a. Rounded projections 88b are provided to facilitate gripping and rotation of adjusting knob 88.

The left-hand end of rod 86 is provided with an enlarged head portion 86b provided with an opening 86c for receiving pin 90 which extends through opening 86c and openings 92a, 92b in the bifurcated arms of a substantially Y-shaped member 92 to form a safety clevis joint with the end 86b of rod 86. Member 92 is rotatably joined to one end 94a of an elongated rod 94 of substantially square-shaped cross-section. Member 94 extends through a square-shaped opening 96a provided within an integral projection 96b of a second mounting bracket 96 secured at 64b of mold half 64 by threaded fasteners T.

The mounting bracket 96 is provided with a further projection 96c which has an opening 96d for receiving a pin 96e for joining the right-hand ends of elongated plates 98, 100 whose left-hand ends are secured to an operating handle 102.

A second pair of plates 104, 106 have their right-hand ends pivotally joined to the left-hand end of square-shaped rod 94 by means of a pin 108 extending through an opening 94b in the left-hand end of rod 94. The left-hand ends of plates 104, 106 are pivotally joined to plates 98, 100 at a point substantially intermediate their left-and right-hand ends by means of a pin 110.

The hinge and clamping assemblies of FIGS. 8 through 11 may also be employed in the mold assembly of FIGS. 3 through 6.

Figure 10C:
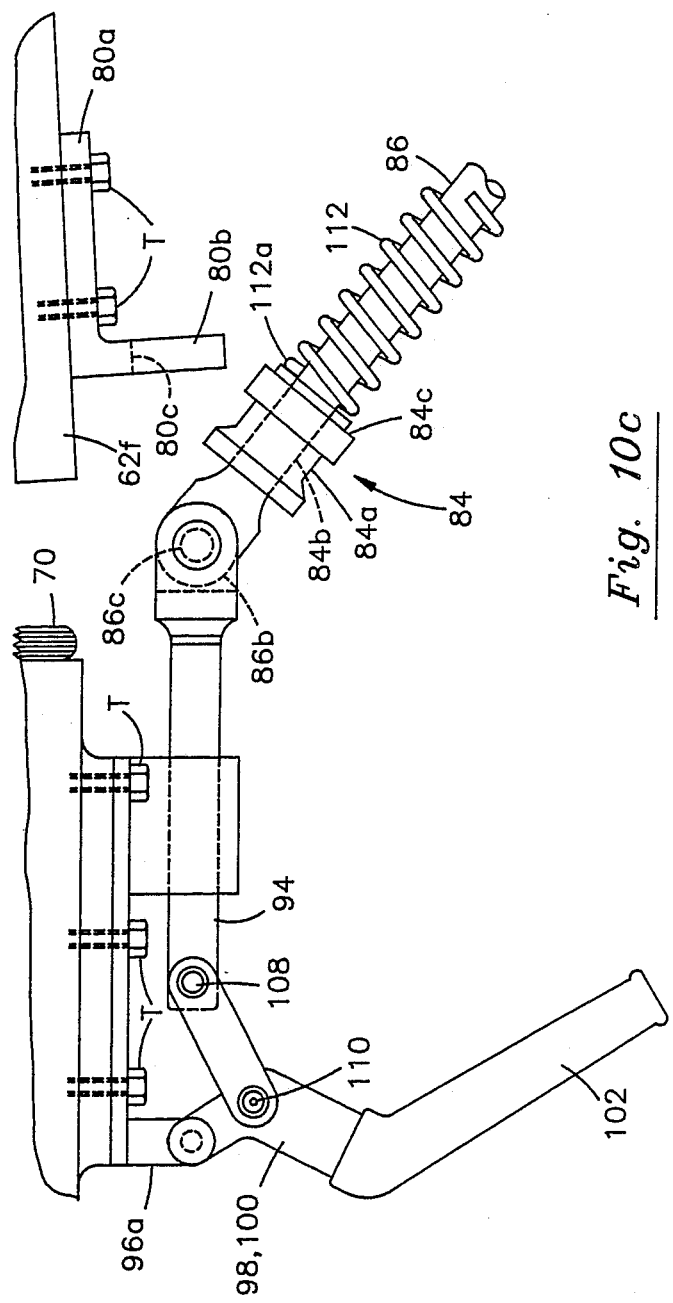
FIG. 10c shows the spring expansion lock assembly of FIGS. 10a and 10b in the open position.

The manner in which the toggle action high compression spring expansion lock assembly operates as follows:

Assuming that the mold halves are open, for example, as shown in FIG. 10c, the mold halves are moved toward one another so as to bring the surface of land 62f (see FIG. 8b) into engagement with gasket 70. If necessary, gasket 70 is placed under at least slight compression by an amount sufficient to enable rod 86 to be rotated from the position shown in FIG. 10c toward the position shown in FIG. 10b to enable the reduced diameter portion 84a to be moved into the U-shaped slot 80c in bracket portion 80b.

With rod 86 and member 84 in the position shown in FIG. 10b and with the toggle assembly in the unlocked position as shown in FIG. 10c, the operating handle is moved from the position shown in FIG. 10c to the position shown in FIG. 10b causing the square-shaped rod 94 to be drawn toward the left thereby pulling bifurcated member 92 and rod 84 toward the left to place helical spring 112, which surrounds elongated rod 86, under compression. The left-hand end at 112a of spring 112 bears against surface 84c of member 84 while the right-hand end 112b of spring 112 bears against the surface 88c of pressure adjusting knob 88. The toggle action is an over-center toggle action causing the locking assembly to be maintained in the locked position under the force of spring 112. The spring force of the compression spring 112, together with adjustment of pressure adjusting knob 88 serves to maintain adequate pressure upon seal 70 to maintain seal 70 under compression to assure a good watertight seal when the mold halves are so joined and locked.

As the water freezes, it expands causing the mold halves to be moved apart whereupon the high compression spring 112 undergoes still further compression in a substantially controlled manner to normally initially maintain the seal 70 under compression to provide an excellent watertight seal during the initial freezing of the water while providing controlled expansion as the water freezes, the compressible seal being of a size so as to be initially compressed sufficient to seal the space between lands 62f and 64f and to maintain the seal for a period of time sufficient to assure that the water will freeze before the displacement distance between lands 62f and 64f becomes greater than the expanded thickness of seal 70.

The toggle assembly may be unlocked by moving the handle past the locked over-center position to the position shown in FIG. 10c which is typically performed when it is desired to open the mold assembly.

It should further be noted from a consideration of FIG. 8a, for example, that the high compression expansion hinges may also be made adjustable by providing pressure adjusting knobs in place of the hinge pin utilized in the embodiment shown in FIGS. 9a and 9b. This is easily accomplished by providing a threaded portion at the free end of elongated rod 74f and mounting a pressure adjusting knob 116 having a tapped opening upon the threaded right hand end of rod 74f. The left-hand end of the knob bears against the compression spring and is adjusted to apply the desired amount of closing force.

The decorative ice form is produced in the following manner:

The mold assembly is closed by placing toggle locks 78 and 80 in the locked position in the manner described and the mold assembly is placed with the casters C resting upon the ground or other suitable supporting surface.

Water is poured into the mold cavities substantially to a level close to the top of the mold typically 3 to 4 inches from the top. Alternatively, the mold may be provided with a latex liner which would be filled with water in the same manner, although this arrangement is not necessary due to the effectiveness of the seal 70.

The mold assembly, which is rather heavy now since it contains anywhere from at least 100 to 200 to 300 pounds of water as well as the weight of the mold assembly itself (typically several hundred pounds), is rolled into a freezer compartment such as walk-in freezer (not shown for purposes of simplicity). The mold assembly which is now filled with water is maintained in the freezer for a period of the order of 20 hours or so while maintaining a temperature of the order of 28° to 32° F.

The mold is then removed from the freezer and left to stand at room temperature for at least 30 minutes. After this standing time the mold assembly is turned upside down in order to place the ice sculpture right side up whereupon the toggle locks are opened and the ice sculpture is removed and then returned to the freezer until it is ready for use.

The mold should preferably be filled with water to within three inches from the top open end. In the event that local water contains impurities that may cloud the center of the ice, food coloring may be used to color the water. The clarity of the ice may also be improved by using either distilled or boiled water. Air should be removed from the water in order to provide a crystalline appearance to the ice sculpture.

Colors may be layered in the ice mold by freezing one color layer at a time than adding another color layer.

Figure 11:
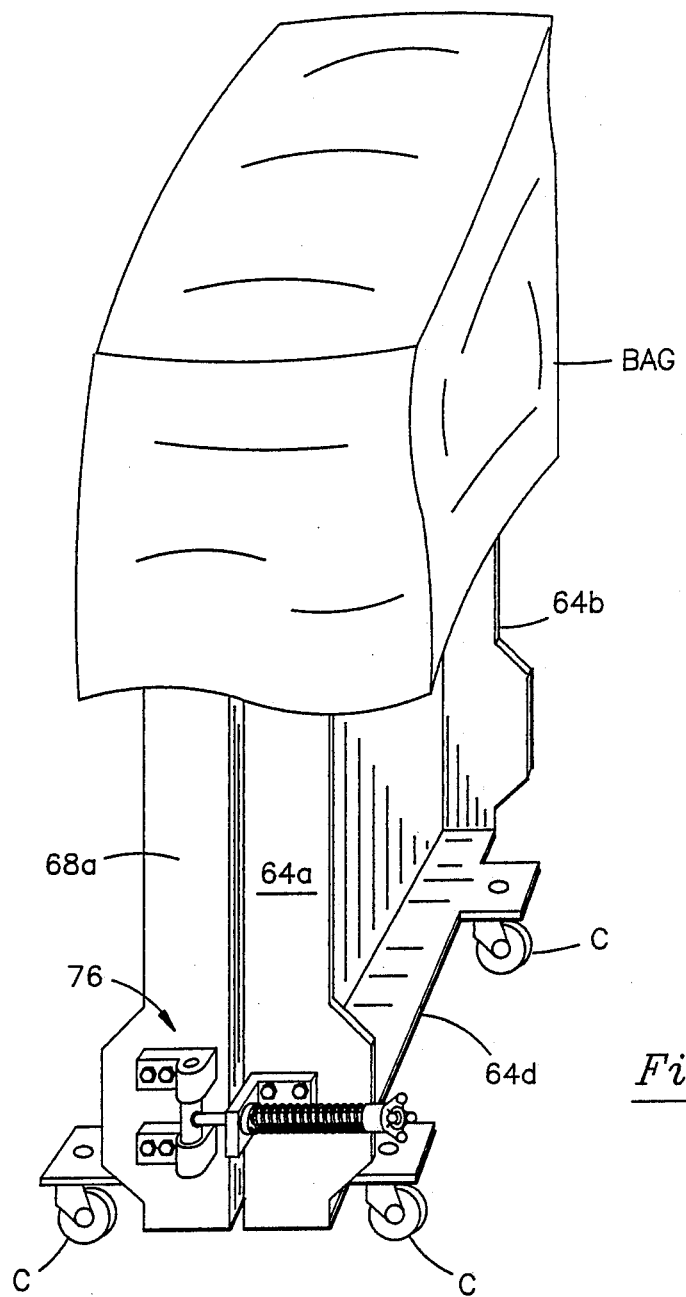
FIG. 11 shows a perspective view of the mold assembly of FIG. 8 preparatory to placement in a freezer.

Freezing of the water may take place more evenly by placing an insulating bag over the open top end of the filled mold assembly in the manner shown in FIG. 11. The insulated bag prevents the uppermost portion of the water within the mold cavity from freezing first.

The molded members formed weigh at least 100 pounds and typically anywhere from 160 to 300 pounds frozen. The ice mold is an aluminum casting weighing between 200 to 250 pounds depending upon the ice creation being molded. The mold is preferably formed of a tempered aluminum and has a baked white enamel finish which is preferably baked on at a temperature in excess of 350° F. to facilitate the ease of removal of the ice mold. If desired any other finish may be employed for the purpose of facilitating removal of the finished ice form.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. A method for producing large decorative ice forms comprising the steps of:

providing a pair of metallic mold halves each having a cavity extending into a planar surface of each mold half;

joining the mold halves whereby their planar surfaces are positioned in close proximity to one another and aligned so that the cavities in said mold halves cooperatively define a unitary hollow mold;

placing a resilient, compressible seal between said planar surfaces surrounding and immediately adjacent to and conforming to the perimeter of said cavities defining said hollow mold to seal said hollow mold and prevent leakage therefrom into the region between said planar surfaces;

urging the mold halves together with an initial force sufficient to compress said compressible seal to thereby provide a watertight seal about said hollow mold;

applying yieldable forces at a predetermined plurality of individual locations at spaced intervals about said mold halves;

filling the hollow mold with water through an opening along the upper portion of the mold assembly cooperatively formed by the coaligned cavities;

placing the mold assembly in a cooling chamber to thoroughly freeze said water whereby the cold is conducted to the water by the metallic mold halves;

independently adjusting said yieldable forces to apply sufficient pressure to keep said mold halves closed while said water freezes;

moving the mold halves apart in a controlled manner to allow for the expansion of the water as it freezes whereby the yieldable force urging the mold halves together is less than the expansion forces exerted upon the mold halves by the freezing water to enable the aforesaid expansion without distortion or damage to the mold halves.

2. The method of claim 1 further comprising the steps of:

removing the mold assembly from the cooling chamber when the water is completely frozen;

removing the forces exerted upon said mold halves and opening said mold halves a predetermined time after the mold assembly has been elevated to room temperature for a predetermined time period; and removing the frozen decorative ice form from the mold assembly;

3. The method of claim 2 wherein said time period is at least 15 minutes.

4. The method of claim 3 wherein said time period is 30 minutes.

5. The method of claim 2 further comprising the step of returning the decorative ice form to the cooling chamber after removal from the mold assembly to preserve the ice form for subsequent use.

6. The method of claim 1 further comprising the step of placing an insulating bag over the open end of the mold assembly preparatory to placing the mold assembly into the cooling chamber to reduce the tendency of the water in the upper portion of the hollow mold to freeze before the water in the lower portion of the hollow mold.

* * * * *

UNITED STATES PATENT AND TRADEMARK OFFICE
CERTIFICATE OF CORRECTION

PATENT NO. : 4,971,737
DATED : November 20, 1990
INVENTOR(S) : Vittorio Infanti

It is certified that error appears in the above-identified patent and that said Letters Patent is hereby corrected as shown below:

In the Abstract, line 1, change "scupture" to --sculpture--

In the Abstract, line 3, change "objects" to --object--

Column 4, line 39, change "minute" to --minutes--

Column 4, line 41, change "forth" to --fourth--

Column 10, line 66, change ";" to --.--

Signed and Sealed this

Third Day of August, 1993

Attest:

MICHAEL K. KIRK

Attesting Officer     Acting Commissioner of Patents and Trademarks